UNITED STATES PATENT OFFICE.

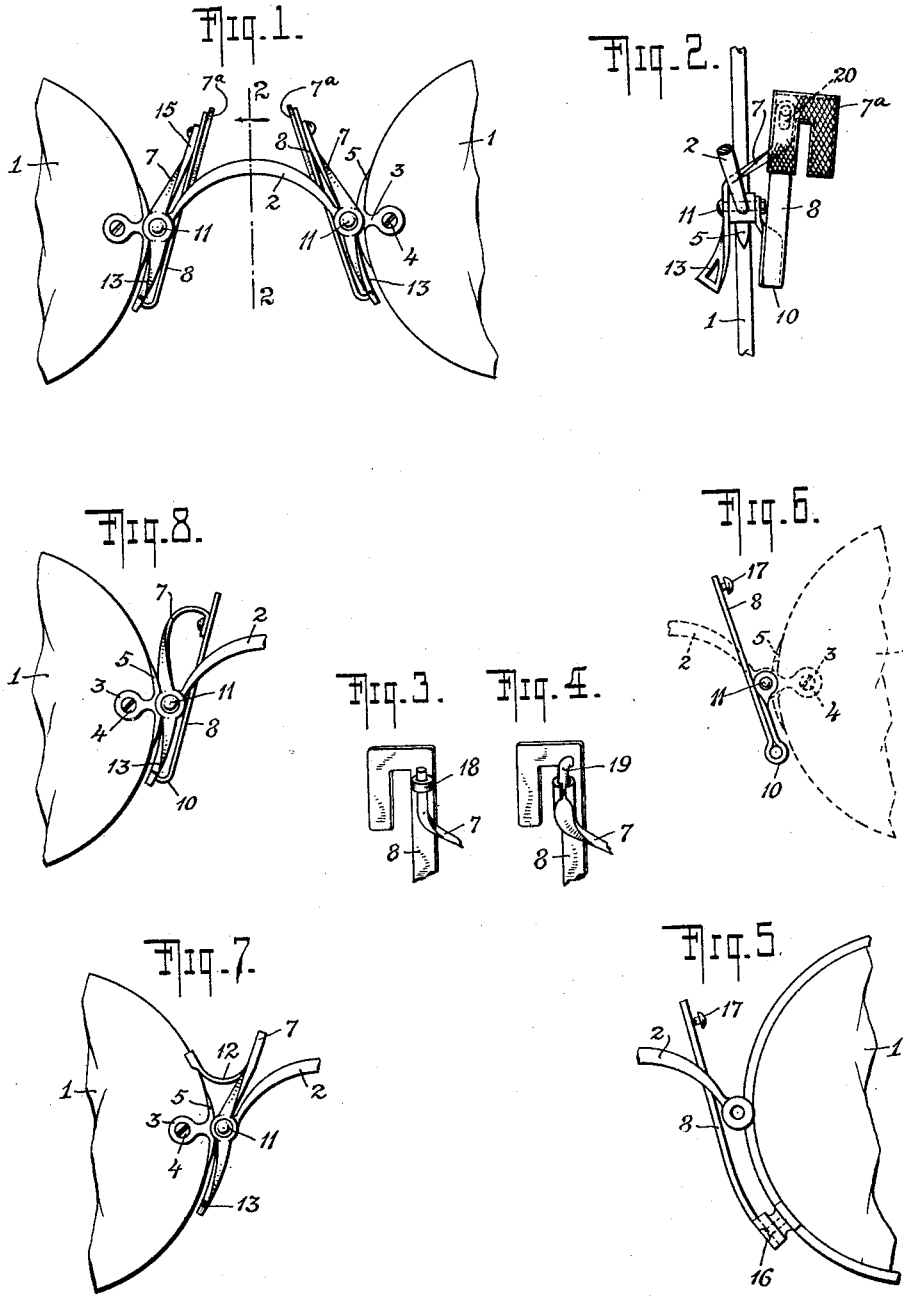

FRIEDRICH PELS-LEUSDEN, OF BERLIN, GERMANY.

RIGID-BRIDGE EYEGLASSES.

1,112,830.  Specification of Letters Patent.  Patented Oct. 6, 1914.

Application filed June 26, 1913. Serial No. 775,857.

*To all whom it may concern:*

Be it known that I, FRIEDRICH PELS-LEUSDEN, a subject of the German Emperor, residing at Berlin, Germany, have invented certain new and useful Improvements in Rigid-Bridge Eyeglasses, of which the following is a specification.

My invention relates to eyeglasses provided with rigid bridges and to the particular class of such eyeglasses known as the finger-piece variety.

More especially, my invention herein set forth is an improvement in the type of eyeglasses shown and described in my pending application No. 728,381, filed October 21, 1912. In said specification eyeglasses are disclosed which are provided with a rigid bridge and an arrangement of finger-pieces in which the turning or pivotal axis of each finger-piece is perpendicular or approximately perpendicular to the plane of the lenses, instead of parallel thereto as in the usual construction, thereby securing certain peculiar advantages fully set forth in the specification referred to.

The object of my present invention is to provide an eyeglass of the type just referred to, having certain special features of construction by means of which certain advantages are obtained. The chief among these novel constructive features, is the elimination of the spiral spring which controls the clamping plates or guards and the substitution therefor of other forms of springs better able to resist the wear and tear of daily use, simpler to make and to position, and having a wider range of resiliency. Associated with this feature is the provision of special finger-pieces for spreading the clamping plates, said finger-pieces being independent of but slidably or yieldingly related to the clamping plates, and finger-pieces and clamping plates being independently turnable about different axes.

Other features of my invention will appear as the specification proceeds.

Referring to the drawings, Figure 1 represents a partial front elevation and Fig. 2 a section along the line 2—2 of Fig. 1, of an eyeglass embodying a preferred form of my invention; Figs. 3 and 4 represent respectively, partial perspective views showing different modes of adjustably attaching the finger-piece spreader arms to the clamping plates; Figs. 5 and 6 represent views, similar to that of Fig. 1, showing forms of my invention employing two different constructions for attaching the clamping plate arms; and Figs. 7 and 8 show two other modifications of my invention provided with two different auxiliary spring constructions for adding to the resiliency of the clamping plate arms.

In the drawings in all the modifications (except Fig. 5 which shows a rimmed eyeglass), the lenses 1 are connected by a rigid bridge 2 provided with ears 3 to embrace the lens, and are fastened in position by screws 4; lugs 5, attached to the bridge or to the parts joined thereto, bear against the edge of each lens for a greater distance above and below said ears. Other styles of connecting structure may be employed within the spirit of my invention.

In the form shown in Figs. 1 and 2, the clamping plates 7ª are preferably of the shape shown, roughly describable as inverted U-shape, although other suitable designs of clamp plate may be employed, if desired. One branch of this U plate is rigidly attached to the upper end of a clamping plate arm 8 of resilient material which extends downwardly and outwardly to a point somewhat below the center of the lenses and then bends at 10 upwardly and outwardly and has its other end attached immovably to a boss in which is inserted the pivot post 11, substantially perpendicular to the plane of the lenses, upon which the finger-piece lever turns. This finger-piece lever has a lower arm, or finger-piece proper 13 and an upper arm 7 bent across the plane of the lenses and arranged to slidably coöperate with the back of the clamping plate 7ª. For this purpose a short slot 20 is cut into the top edge of the arm and into this slot is fitted a pin 17 riveted or otherwise suitably fixed upon the back of the clamping plate and provided with a head which prevents the pin and slotted arm from becoming disconnected. The clamping plate arm 8 is preferably of flat metal as shown and is positioned and shaped so that when the two clamp arms with their clamping plates, are in their innermost positions, they will rest upon the sides of the nose with about the right amount of pressure, while the clamping plates proper will extend into the inner canthi of the eyes and rest against the top of the arch of the eye cavity.

To put these eyeglasses on or take them off, the finger-pieces 13 are grasped between the thumb and fore-finger in the usual way and pinched together. The upper arms 7 are thereby moved outwardly and carry with them the clamp plates 7ª against the resiliency of the bend at the lower part of the clamp arm. As the clamping plates are thus spread apart or allowed to come together, the upper arm 7 slides upon the back of the clamping plates, but does not become disconnected therefrom.

Instead of using the slot and pin arrangement just described as a connecting means between the upper arm and the back of the clamping plate I may, if I prefer, use either of the types of construction shown in Figs. 3 and 4, or some other equivalent type of construction. In Fig. 3 a ring or ear 18 is rigidly fastened to one branch of the clamping plate and the end of the upper arm is bent and shaped so as to fit within this ring. By making the ring sufficiently long the sliding movement is free and there is no tendency to bind.

In Fig. 4 a bent arm 19 is welded, soldered or stamped out from, or in any other way suitably attached to, the back of one branch of the clamp plate so as to extend downwardly parallel with the branch. The end of the upper arm 7 is flattened or widened, and bent so as to form a short section of a cylinder which fits over the part 19.

Instead of having the clamping plate arm 7 bent back upon itself to be finally attached to the finger-piece pivot-post ends, as shown in Figs. 1 and 2, I may dispense with the outer part of the clamping plate arm by cutting off the arm at about its lowest point and attaching the end directly to the rim at 16 as shown in Fig. 5. This construction cannot, of course, be conveniently employed with rimless glasses.

In Fig. 6 both the inner and outer portion of clamping plate arm 8 lie practically in contact with one another, there being a short radial bend provided at the junction point to give the necessary resiliency.

The constructions of Figs. 5 and 6 are advantageous when the glasses are to be used by those having small pupillary distances as the clamping plate arms are thus kept a reasonable distance away from the nose. In these two constructions, it should be observed that the junction or attaching point of the arm 8 can only lie in the plane of the lenses when the arm itself is bent to one side to avoid the nose bridge, or when the arm is fastened at its bottom to a plate or the equivalent which is itself projected to one side, or when some equivalent construction is adopted.

It may sometimes happen that it is desired to supplement the resiliency of the clamping plate arms; Fig. 7 shows a construction adapted for this purpose. Here the back of the clamping plate is provided with a rigidly attached bent springy strip of metal 12, the free end of which bears against the rim of the lens and is made wide enough to be V'd so as to embrace said rim and not slip therefrom. This springy strip may be a part of the upper arm of the finger piece.

Fig. 8 shows still another arrangement for supplementing the resiliency of the clamping plate arms. Here the upper arm 7 of the finger-pieces is flattened and thinned and otherwise made springy and is bent around so that it can be screwed fast to the back of the clamping plate arm. As the finger-pieces are pinched together and the upper arms moved outwardly, each of said arms bends at its flattened and thinned portions against its own resiliency and this bent part upon release of the finger-pieces, tends to straighten itself out again and thus furnishes the necessary supplementary spring force.

In any of the several constructions shown the clamping plate arms may be so bent that they themselves will lie upon the surface of the nose thus serving both as clamping plates and as clamping plate arms.

When the clamping plates are spread by the operation of the finger-pieces 13 each clamping plate is swung about the center 10 (or 16, Fig. 5) while the finger piece itself swings about a different center 11. It is for this reason that the arm 7 is arranged to slide upon the back of the clamping plate arm (Figs. 1-4) although the same action may be obtained, as has been shown, by making the upper part of arm 7 bowed and flexible as in Fig. 8. And if the bend at 10 (in all constructions except Fig. 5) be made sufficiently flexible, it is clear that the upper part of arm 7 need be neither flexible nor slidable since the entire arm 8 may be moved up and down sufficiently through the yielding of said bend at 8 to permit the clamping plates to be satisfactorily operated in the use of the glasses.

As with the eyeglasses disclosed in my earlier application, Serial No. 728,381, already referred to, so here with the present constructions, the clamping plates may be provided with auxiliary plates at the ends thereof to help steady the eyeglasses upon the nose and to hold them securely in place.

It will be seen from the foregoing description and explanation that my invention herein described enables finger-piece eyeglasses to be provided in which the usual spiral springs commonly found in such eyeglasses and which, as is well known, are fragile and easily injured, are completely dispensed with and that all necessary resiliency for the satisfactory adjustment of the glasses upon the nose is secured by flat leaf springs having sufficient material and dimensions sufficiently great as to make them as strong and durable as any other part of the mounting.

Having described my invention, I claim:

1. In an eyeglass mounting comprising a rigid bridge for connecting the lenses, the combination of clamping plates for gripping the nose, resilient arms engaged with said plates and connected with the mounting and finger pieces for spreading said plates, the finger pieces and the clamping plates being arranged so as to move simultaneously about different axes but in the same angular direction said axes being substantially perpendicular to the plane of the lenses.

2. In an eyeglass mounting comprising a rigid bridge for connecting the lenses, the combination of nose guards having arms of resilient material which are bent back upon themselves to form loops and have their free ends connected to the mounting, the plane of said loops being substantially that of the lenses, and finger pieces pivoted upon axes which are perpendicular to the lenses and coincident with the attaching points of said free ends, one end of each finger piece being engaged with a nose guard.

3. In an eyeglass mounting comprising a rigid bridge for connecting the lenses, the combination of clamping plates for gripping the nose provided with resilient arms connected with the mounting, and finger pieces, operatively connected with said plates, at a point above the connection of resilient arm and mounting for spreading them, the finger pieces and the clamping plates being arranged to move in substantially the same plane.

4. In an eyeglass mounting comprising a rigid bridge for connecting the lenses, the combination of clamping plates for gripping the nose provided with resilient arms connected with the mounting, and finger pieces having sliding engagement with said plates for spreading them, the finger pieces and the clamping plates being arranged to move simultaneously in the same angular direction and in substantially the same plane.

In testimony whereof I have hereunto set my hand in the presence of two subscribing witnesses.

FRIEDRICH PELS-LEUSDEN.

Witnesses:
 WOLDEMAR HAUPT,
 HENRY HASPER.

Copies of this patent may be obtained for five cents each, by addressing the "Commissioner of Patents, Washington, D. C."